US006705044B2

United States Patent

Clancey

(10) Patent No.: US 6,705,044 B2
(45) Date of Patent: Mar. 16, 2004

(54) ADJUSTABLE ROOT COVERS

(76) Inventor: Francis C. Clancey, 26 Temple Rd., Lynnfield, MA (US) 01940-2020

( * ) Notice: Subject to any disclaimer, the term of this patent is extended or adjusted under 35 U.S.C. 154(b) by 0 days.

(21) Appl. No.: 10/373,732

(22) Filed: Feb. 27, 2003

(65) Prior Publication Data

US 2003/0182852 A1 Oct. 2, 2003

Related U.S. Application Data

(60) Provisional application No. 60/367,497, filed on Mar. 27, 2002.

(51) Int. Cl.$^7$ ................................................ A01G 13/02
(52) U.S. Cl. ............................ 47/32; 47/31.1; 47/32.4
(58) Field of Search ............................ 47/32, 31.1, 32.4

(56) References Cited

U.S. PATENT DOCUMENTS

| 283,837 | A | * | 8/1883 | Wallace | 47/32.4 |
|---|---|---|---|---|---|
| 334,743 | A | * | 1/1886 | Byler | 47/32.4 |
| 2,519,678 | A | * | 8/1950 | Mac Kenzie | 56/329 |
| 2,868,255 | A | * | 1/1959 | Fancher | 206/423 |
| 3,305,969 | A | | 2/1967 | Mattson | |
| 3,673,134 | A | * | 6/1972 | Anderson | 523/132 |
| 3,750,731 | A | * | 8/1973 | Brimmell | 206/423 |
| 3,891,423 | A | * | 6/1975 | Stanley et al. | 504/175 |
| 4,058,956 | A | * | 11/1977 | Skonieczny | 56/1 |
| D283,003 | S | | 3/1986 | McKinley | |
| 4,646,467 | A | * | 3/1987 | Morrisroe | 47/20.1 |
| 5,085,001 | A | | 2/1992 | Crawley | |
| 5,117,582 | A | * | 6/1992 | Cissel et al. | 47/32.4 |
| 5,211,338 | A | | 5/1993 | Leite et al. | |
| 5,323,557 | A | | 6/1994 | Sonntag | |
| 5,379,558 | A | * | 1/1995 | Mason, III | 52/105 |
| 5,396,731 | A | | 3/1995 | Byrne | |
| 5,522,176 | A | | 6/1996 | Suttle | |
| D413,495 | S | | 9/1999 | Carter | |
| 6,090,466 | A | | 7/2000 | Kartisek | |
| 6,128,852 | A | * | 10/2000 | Hansen | 47/32 |
| 6,276,869 | B1 | | 8/2001 | Yakushinji | |
| 6,446,400 | B1 | * | 9/2002 | Block et al. | 52/102 |

FOREIGN PATENT DOCUMENTS

| FR | 2767451 A3 | * | 2/1999 | .......... A01G/13/02 |
|---|---|---|---|---|
| GB | 2 207 845 A | | 2/1989 | |
| JP | 408089105 | * | 4/1996 | .......... A01G/13/02 |
| JP | 2002339341 | * | 11/2002 | .......... A01G/13/02 |
| WO | WO 90/01256 | | 2/1990 | |

* cited by examiner

Primary Examiner—Son T Nguyen
(74) Attorney, Agent, or Firm—Richard C. Litman

(57) ABSTRACT

Adjustable landscaping ergonomic pads of various shapes adapted for covering the soil around the trunks of shrubs, trees, and garden plants to completely eliminate and retard the growth of weeds and other undesirable plants.

8 Claims, 6 Drawing Sheets

ADJUSTABLE ROOT COVERS

CROSS-REFERENCE TO RELATED APPLICATION

This application claims the benefit of U.S. Provisional Patent Application Ser. No. 60/367,497 filed Mar. 27, 2002.

BACKGROUND OF THE INVENTION

1. Field of the Invention

The present invention relates generally to plant protectors. More specifically, the present invention is a landscaping fibrous pad cover having various shapes with some apertured in the center, and adapted for covering the soil around the trunks of shrubs, trees, and garden plants to completely eliminate or retard the growth of weeds and other undesirable plants.

2. Description of Related Art

The related art of interest describes various plant protecting covers, but none discloses the present invention. There is a need for a plant cover, which is inexpensive and satisfies the protection needed to prevent weeds from growing around the desired plant, and yet permit some watering from the absorption of water by the cover.

The related art will be discussed in the order of perceived relevance to the present invention.

U.S. Pat. No. 5,396,731 issued on Mar. 14, 1995, for Steven E. Byrne describes a mulch composition pad for trees having a circular configuration with a keyed slot leading from the outside edge to the centered aperture. The composition is made from ground rubber tire granules 0.25 to 0.75 in. large, rubber powder or buffings, and less than an inch long tire fibers of rayon or nylon mixed with a curable binder of latex or urethane, iron oxide pigment as a coloring agent, diatomaceous earth, a catalyst, and some ultraviolet (UV) light stabilizers and antioxidants. Grass does not grow through the mulch pad. The mulch pad is distinguishable for requiring ground rubber products, iron oxide pigment, diatomaceous earth, a catalyst, UV light stabilizers, and antioxidants.

U.S. Design Pat. No. 413,495 issued on Sep. 7, 1999, for Ronald D. Carter describes an ornamental circular domed metal tree protector made from a wire mesh attached to metal half-rings. The tree protector is distinguishable for requiring a metal mesh protector.

PCT Patent Application No. WO 90/01256 published on Feb. 22, 1990, for Svein Lilleengen describes a slotted cover disk made from fermented dung and impregnated with growth promoting and binding substances for promoting plant growth and inhibiting weed growth. The cover disk is distinguishable for being limited to a flat slotted disk and fermented dung materials.

U.S. Design Pat. No. 283,003 issued on Mar. 18, 1986, for DeWitt McKinley describes an ornamental one-piece metal tree grate in either a square or circular flat shape having radial indentations on top and a square grid pattern on the bottom. The grates have an open circular center. The tree grates are distinguishable for requiring a unified flat metal construction.

U.S. Pat. No. 5,085,001 issued on Feb. 4, 1992, for Michael S. Crawley describes a stabilized mulch skirt comprising a single sheet having an axial opening and a slit extending to the periphery, and a plurality of adjustment strips formed around the axial for custom-sizing at the site to fit the trunk. A plastic or steel ring anchored by pins stabilize the skirt. The device is distinguishable for requiring a mulch skirt.

U.S. Pat. No. 3,305,969 issued on Feb. 28, 1967, for Merle E. Mattson describes a tree or plant protector collar device comprising a circular porous plastic material having a centered aperture with a slit to the periphery of the collar. The collar is distinguishable for requiring a porous plastic material.

U.S. Pat. No. 5,211,338 issued on May 18, 1993, for Diva C. Leite et al. describes a planar sprinkler shield device of unknown composition for minimizing plant growth underneath arranged around a sprinkler head inside its centered aperture, and having frangible portions with spikes to permit geometric tailoring. The device is distinguishable for requiring frangible regions of a circular shape which is staked down.

U.S. Pat. No. 5,323,557 issued on Jun. 28, 1994, for Donald J. Sonntag describes a flexible landscaping mat (unknown material) comprising three circular regions and a centered aperture for a tree trunk or a post. The inner region has guide rings for sizing the hole to the tree trunk. A slit extends from the periphery to the center or through the diameter. The intermediate region has scored circles for staking and ribs for retaining ornamental materials such as rocks, bark, wood chips, or mulch. The mat is distinguishable for requiring a textured mat.

U.S. Pat. No. 5,522,176 issued on Jun. 4, 1996, for Gene C. Suttle describes a landscaping ground cover to be placed around a tree or a shrub to prevent the growth of grass, weeds or other foliage, and to protect the tree or shrub. The cover comprises a circular sheet of flexible vinyl plastic having a square perimeter path for shaping the cover, a series of concentric circular paths or recessed channels in the center and upper surface, and a plurality of drainage holes. The ground cover is distinguishable for laying flat on the ground around a tree or shrub, and requiring shaping to fit the ground area.

U.S. Pat. No. 6,090,466 issued on Jul. 18, 2000, for William G. Kartisek describes a nylon pruning cloth which has a split down its center and terminates at a central circular section for the tree trunk. A pouch is sewn on one side of the cloth to collect pruned clippings. Pulling cords and four circular rings are formed at the opposite end. The pruning cloth is distinguishable for requiring a pouch, pulling cords, and apertures for the cords.

U.S. Pat. No. 6,276,869 B1 issued on Aug. 21, 2001, for Kuniaki Yakushinji describes an opaque circular and convex synthetic resin plate having two equal segments attachable with fasteners, and a center hole having an outwardly curving neck for controlling weeds around a tree root. The weed control plate is distinguishable for being a bowl-shaped inflexible cover placed upside down.

U.K. Patent Application No. GB 2 207 845 A published on Feb. 15, 1989, for John M. Moore describes a cover for a plant container comprising a pliable circular member having a centered aperture and a slot going to an area with a plurality of radially slotted segments to permit the size of the aperture to expand. The cover is distinguishable for being limited only to shape changing to allow greater inside space.

None of the above inventions and patents, taken either singly or in combination, is seen to describe the instant invention as claimed.

SUMMARY OF THE INVENTION

The present invention is an adjustable landscaping pad adapted for covering the soil around the trunks of shrubs, trees, and garden plants to completely eliminate or retard the growth of weeds and other undesirable plants. The covers are made from fibrous woven cloth such as jute, hemp, cotton, nylon, Mylar (TM) rayon, and polyester. Jute and hemp are considered burlap cloths. The preferred cloths have either a circular form with a centered aperture or a rectangular length with slits on one long side to spread out on the ground. A preferred embodiment has two cords woven into the upper portion of a circular fibrous cloth having a slot traversing from the outside edge to a centered aperture for wrapping around a trunk or stem. The cords tighten the cover in opposite directions. Other embodiments can be simply tied externally by a separate cord to the trunk or stem. Other shapes such square, oblong, star, and triangular shapes are contemplated which would depend on the arrangement configuration of plant or plants to be protected. These cloths have a valuable property when they are tied around the stem or trunk of a plant of absorbing and distributing the absorbed water, and preventing weed growth. Other ergonomic advantages are providing insulation during cold weather and minimizing the use of herbicides and insecticides. These covers can have various other shapes such as triangular, square, oblong, and star-shaped, and are also inexpensive to make and produce.

Accordingly, it is a principal object of the invention to provide an inexpensive ergonomic root cover for plants to prevent the proximate formation of weeds, provide insulation and supply absorbed water.

It is another object of the invention to provide an inexpensive root cover having various shapes such as circular, rectangular, square, star, oblong, and triangular shapes.

It is a further object of the invention to provide a preferred first, second and third embodiments of an inexpensive root cover having a circular shape with two hemmed tying cords, one hemmed cord, and no cord respectively, positioned to tighten in opposite directions.

Still another object of the invention is to provide a fourth preferred embodiment of a rectangular cover having slits on one side for spreading out on the ground.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an adjustable root cover comprising a planar fibrous woven cloth selected from the group consisting of jute, hemp, cotton, nylon, Mylar (TM), rayon, polyester. In the four embodiments illustrated, the root cover can have either a circular form with a centered aperture or a rectangular length. The cloth is tied around the stem or trunk of a plant for absorbing and distributing water, and preventing weed growth. A circular root cover can have one or two hemmed tying cords for securing the cover to a tree trunk or a plant stem. Other rectangular covers can have slits on their bottom edges or not. The tying of the covers to the trunk or stem can be done by using an external cord.

Figure 1:
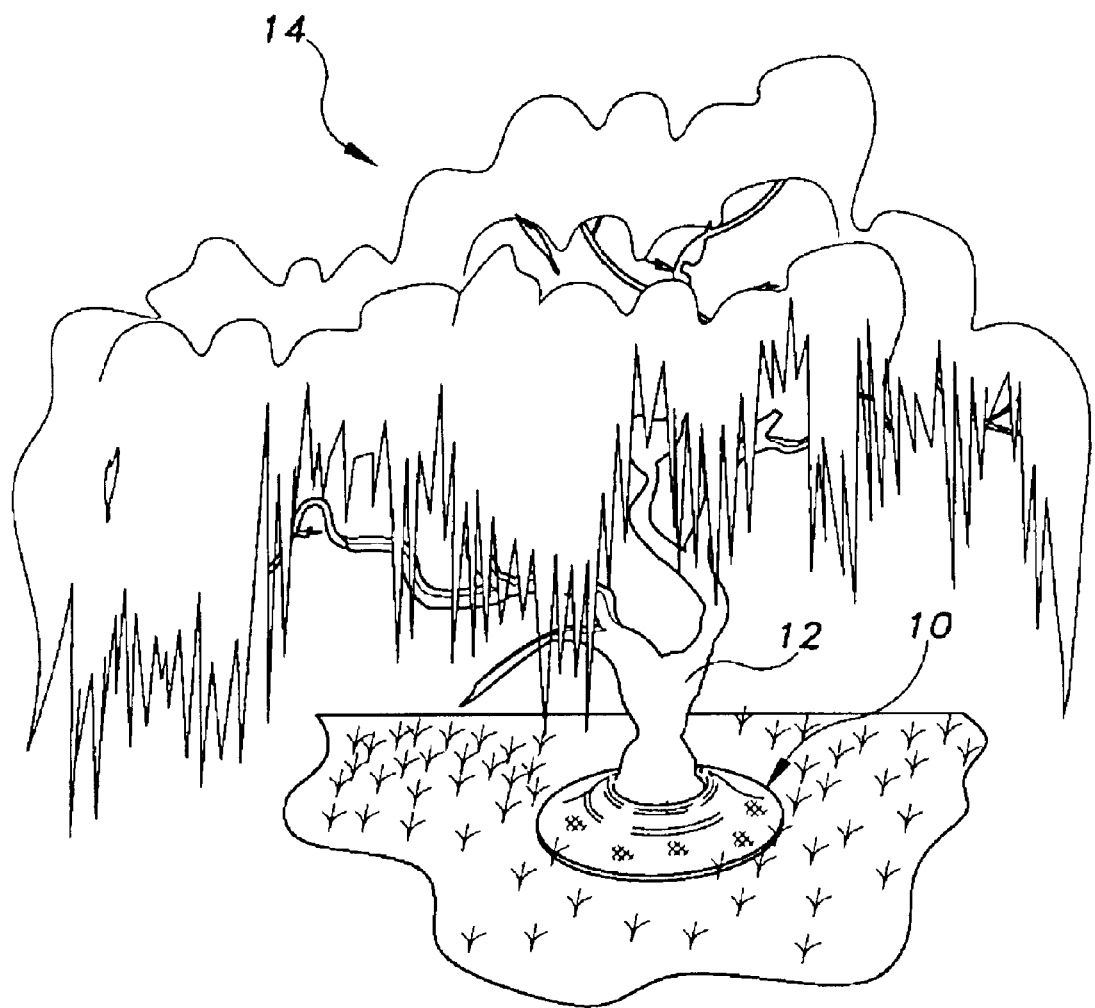
FIG. 1 is an environmental, perspective view of an adjustable burlap root cover or pad for a tree according to the present invention.
Figure 2:
FIG. 2 is an environmental, perspective view of small plants with adjustable burlap root covers or pads.

In FIG. 1, a generic adjustable root cover 10 is tied around the trunk 12 of a tree 14 to cover the immediate ground 16 adjacent the trunk 12. In FIG. 2, a plurality of plants 18 in two rows 20 inside a fence 22 have their stems 24 protected by a generic adjustable root cover 26 having a smaller size.

Figure 3:
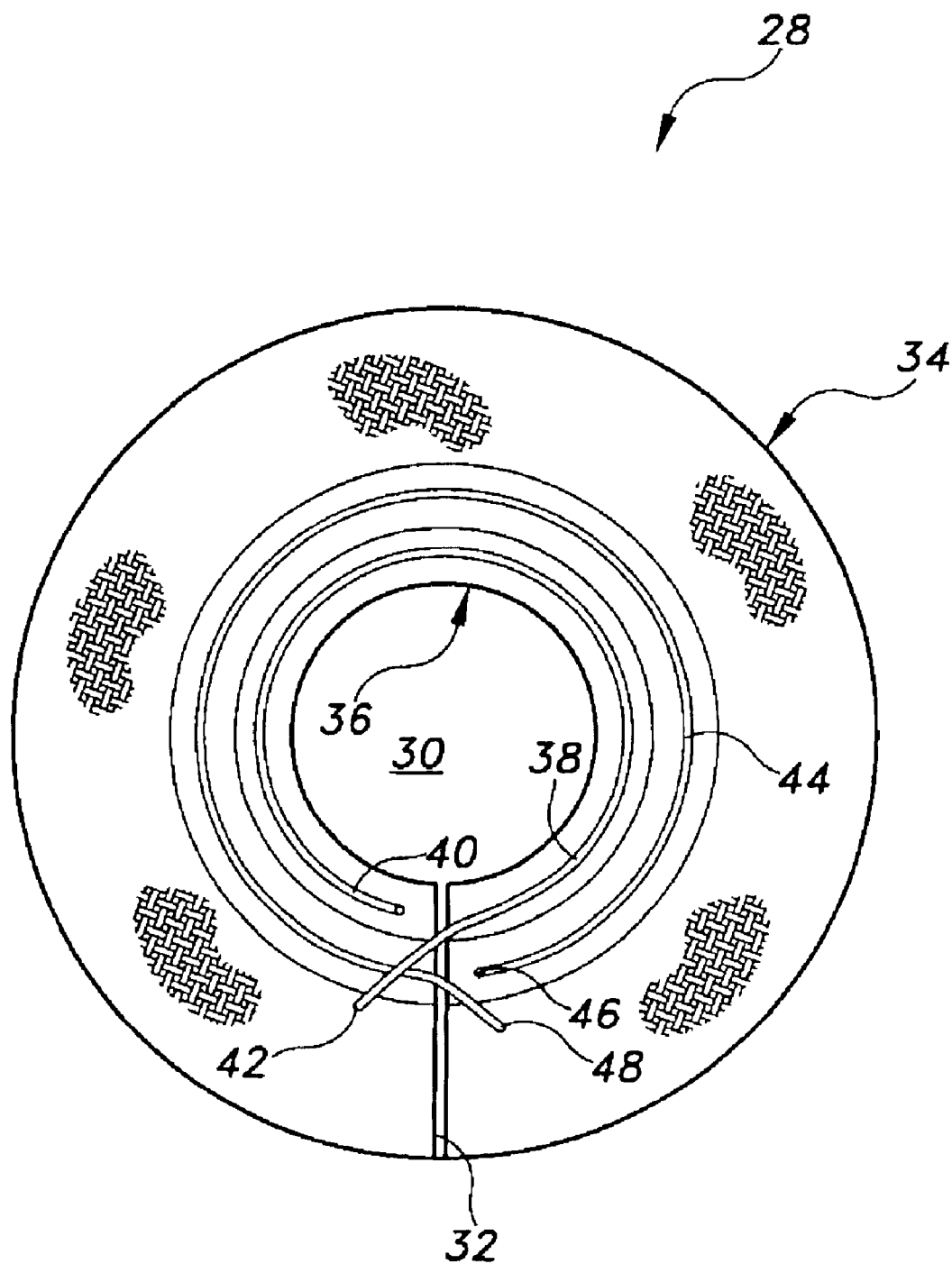
FIG. 3 is a top plan view of a first embodiment of a circular adjustable burlap root cover or pad having two integrated tying cords tied in opposite directions.

In the first embodiment of FIG. 3, a circular adjustable root cover 28 having a centered circular aperture 30 and a slot 32 traversing from the outer periphery 34 to the inner periphery 36 of the cover 28 is illustrated. The first cord 38 is hemmed adjacent the aperture 30 with its distal end 40 secured to the cover 28 and its proximate free end 42 extending a suitable length to tighten by pulling end 42 in a clockwise direction. The second cord 44 also has its fixed distal end 46 and an extending proximate end 48, but the second cord 44 is arranged to tighten the cover 28 in a counter-clockwise direction. The cords 38, 44 are pulled to wrap and secure the upper portion of the cover 28 around a tree, shrub or plant. In other words, a range of pad sizes is supplied to effectively fit the growth to prevent weeds, supply moisture when wet, and insulate during cold weather.

Thus, a variety of ergonomic adjustable root covers have been shown for adding to trees, shrubs and plants to protect them from weeds, cold or hot weather, and supplying moisture when wet. Another advantage lies in the minimal use of herbicides and insecticides using these ergonomic adjustable root covers. A range of pad sizes is supplied to effectively fit the growth to prevent weeds, supply moisture when wet, and insulate during cold weather.

Figure 4:
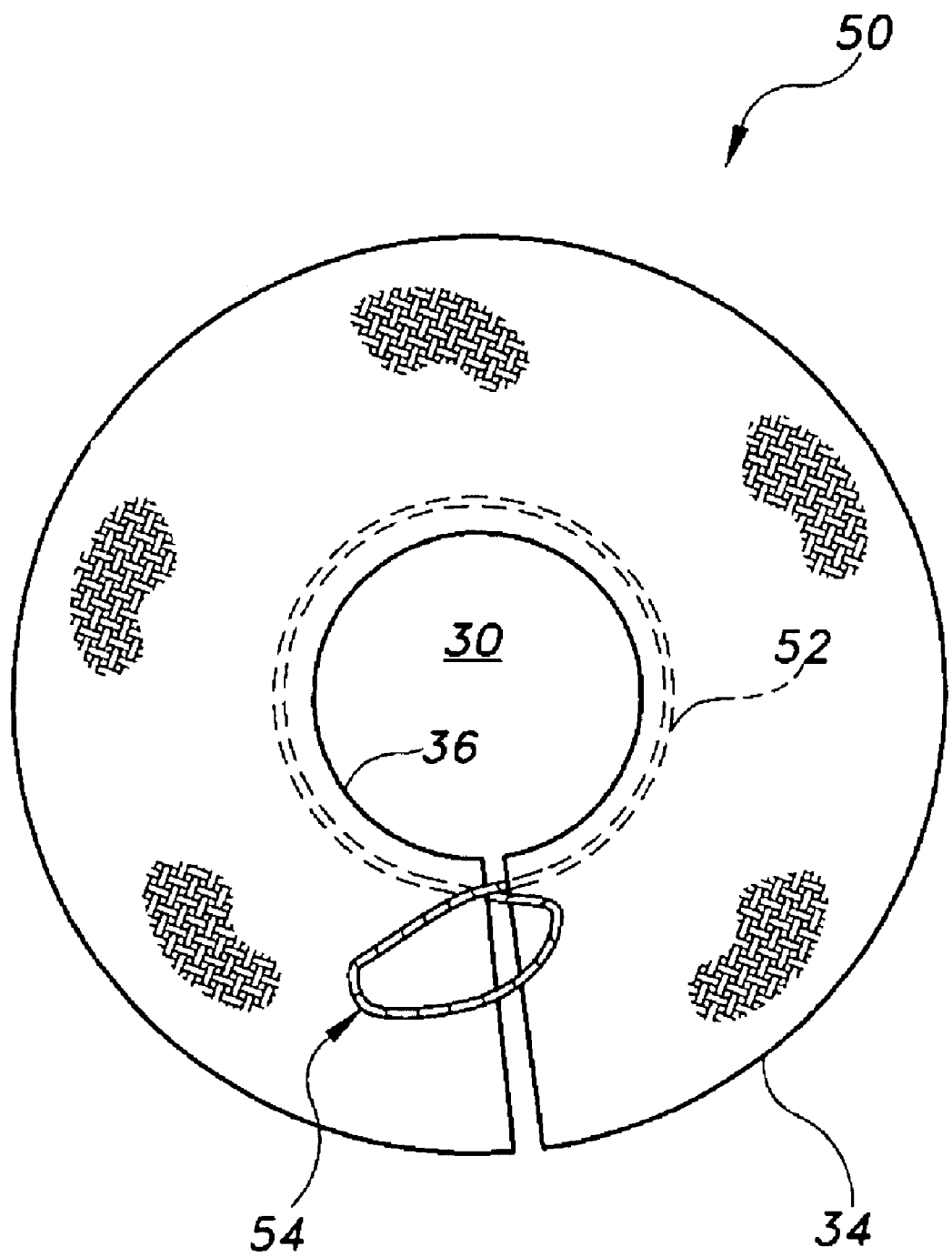
FIG. 4 is a top plan view of a second embodiment circular burlap cover with only one integrated tying cord.

FIG. 4 depicts a second embodiment of a circular burlap cover or pad 50 having a cord 52 hemmed adjacent the inner periphery 36 of the centered circular aperture 30. However, the cord 52 is continuous with the free portion 54 extending out from the sides of the slot 32. Thus, the cover or pad 50 can be added by placing over a small plant and tying the cord 52 or for a larger growth such as a tree or shrub, by first cutting the cord 52 at the free portion 54, placing the open cover 50 around the tree trunk to tie the cover to the tree.

Figure 5:
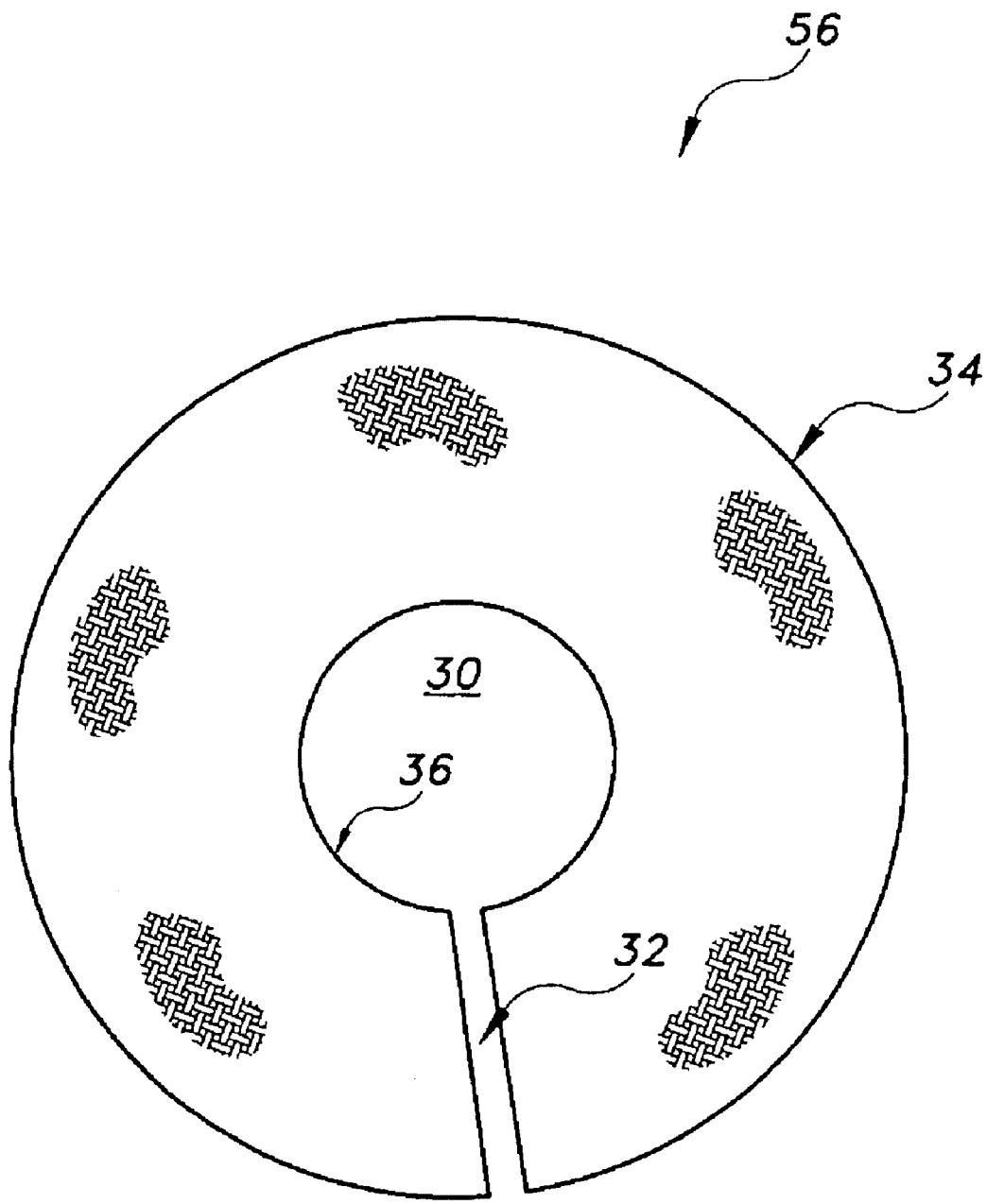
FIG. 5 is a top plan view of a third embodiment circular burlap cover without a cord.

In FIG. 5, a third embodiment of a simplified circular cover or pad 56 having a centered circular aperture 30 and the slot 32 is shown. This cover 56 would require the tying of an external cord (not shown) to fasten the cover to a tree, shrub or plant with overlapping of the cover. The overlapped portion of the cover 56 can be further fastened together with clips (not shown) to ensure that the cover would remain stable during windy conditions.

Figure 6:
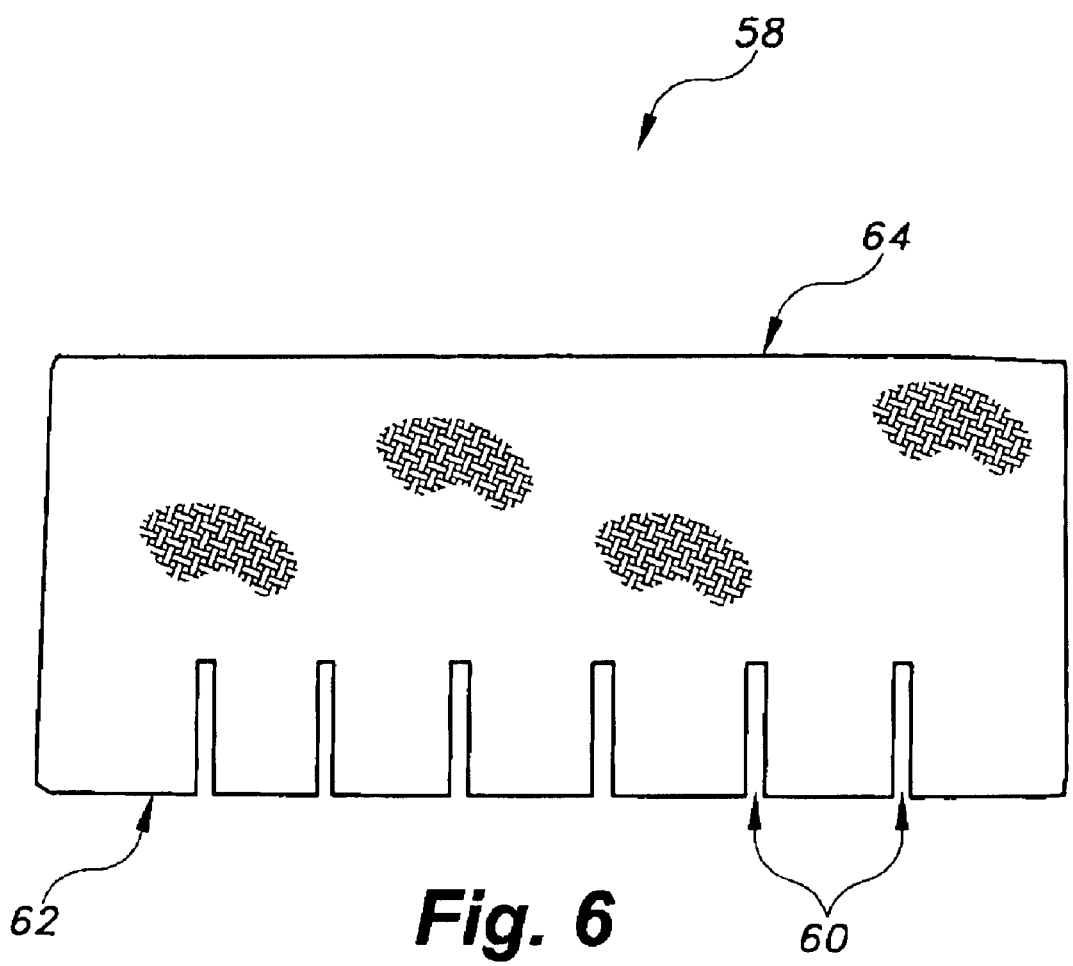
FIG. 6 is a top plan view of a fourth embodiment of a burlap rectangular cover with slits on one length.

In FIG. 6, the fourth and last embodiment of a rectangular cover or pad 58 having spaced slots 60 on the bottom edge 62 which would spread out over the ground when the cover is tied around a growth by a cord (not shown). Optionally, a cord could be hemmed in proximate the top edge 64.

Thus, it can be seen that various inventive configurations have been shown to effectively deter the growth of weeds, supply moisture when wet, and insulate around desired plants and trees during cold weather.

It is to be understood that the present invention is not limited to the embodiments described above, but encompasses any and all embodiments within the scope of the following claims.

I claim:

1. An adjustable root cover comprising:

a single sheeting of flat, woven cloth, said sheeting having an outer peripheral edge, and an inner edge defining a central, circular opening;

a slit extending from said inner edge to said outer peripheral edge of said sheeting;

a first cord being hemmed around said opening in a clockwise direction, said first cord having a first end attached to said sheeting adjacent said inner edge and said slit, and a second end extending beyond said slit; and a second cord being hemmed around said opening in a counter-clockwise direction having a first end attached to said sheeting adjacent said inner edge and said slit, concentric with said first cord, and a second end extending beyond said slit;

wherein said second end of said first cord and said second end of said second cord are configured to be pulled to secure said single sheet to a trunk of a plant; and said woven cloth is capable of absorbing and distributing moisture, and preventing weed growth therethrough.

2. The adjustable root cover of claim 1, wherein said sheeting is made from jute.

3. The adjustable root cover of claim 1, wherein said sheeting is made from hemp.

4. The adjustable root cover of claim 1, wherein said sheeting is made from cotton.

5. The adjustable root cover of claim 1, wherein said sheeting is made from nylon.

6. The adjustable root cover of claim 1, wherein said sheeting is made from Mylar.

7. The adjustable root cover of claim 1, wherein said sheeting is made from rayon.

8. The adjustable root cover of claim 1, wherein said sheeting is made from polyester.

* * * * *